United States Patent [19]
Yamamoto et al.

[11] Patent Number: 5,289,537
[45] Date of Patent: Feb. 22, 1994

[54] ON-HOOK TRANSMISSION CIRCUIT IN CABLE LINE

[75] Inventors: Yuzo Yamamoto; Shinichi Ito, both of Kawasaki, Japan

[73] Assignee: Fujitsu Limited, Kawasaki, Japan

[21] Appl. No.: 971,587

[22] Filed: Nov. 5, 1992

[30] Foreign Application Priority Data

Nov. 7, 1991 [JP] Japan ................... 3-290259

[51] Int. Cl.⁵ ........................... H04M 1/00
[52] U.S. Cl. ..................... 379/377; 379/376; 379/378; 379/405
[58] Field of Search .............. 379/376, 377, 378, 245, 379/247, 127, 142, 405, 246; 370/110.1

[56] References Cited

U.S. PATENT DOCUMENTS

| | | | |
|---|---|---|---|
| 4,455,456 | 6/1984 | Cochran | 379/377 |
| 4,827,505 | 5/1989 | Takato et al. | 379/377 |
| 4,939,777 | 7/1990 | Oka | 379/442 |

FOREIGN PATENT DOCUMENTS

| | | | |
|---|---|---|---|
| 0081374 | 5/1983 | Japan | 379/405 |
| 0092093 | 3/1990 | Japan | 379/388 |

Primary Examiner—James L. Dwyer
Assistant Examiner—Scott L. Weaver
Attorney, Agent, or Firm—Armstrong, Westerman, Hattori, McLeland, & Naughton

[57] ABSTRACT

In an on-hook transmission circuit provided in a subscriber circuit connected between a subscriber terminal and an exchange, a constant-current source unit causes a constant current to flow in first and second wires during a period in which a control signal indicating that on-hook transmission should be turned ON is being received. A loop supervisory unit detects establishment of a loop including the first and second wires and a subscriber terminal connected thereto, and generates a scan signal used for causing the constant-current source means to stop the constant current flowing in the first and second wires after detecting the establishment of the loop.

12 Claims, 7 Drawing Sheets

ON-HOOK TRANSMISSION CIRCUIT IN CABLE LINE

BACKGROUND OF THE INVENTION

1. Field of the Invention

The present invention generally relates to cable-line communications systems, and more particularly to an on-hook transmission circuit provided in a cable line, such as a digital line.

2. Description of the Prior Art

Generally, in a cable telephone line, a called subscriber picks up the handset in response to a call, and information can be transmitted in the off-hook state. Recently, an advanced system has been proposed in which information can be transferred in the on-hook state without picking up the handset in response to a call. This is called an on-hook transmission, and information can be transferred without current flowing in a subscriber terminal when a call is received. Such an on-hook transmission is effective for a case where the called subscriber wishes to know who is calling before picking up the handset.

However, the two wires of the telephone line connected to the telephone terminal are kept open-circuited in the on-hook state, and therefore a modification is needed to achieve the on-hook transmission services.

Figure 1:
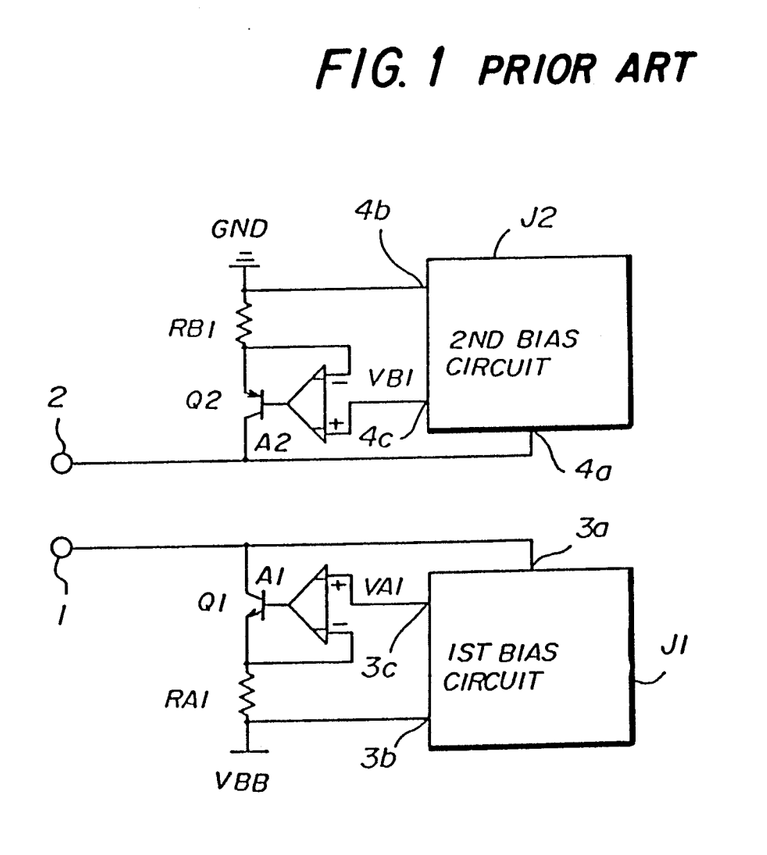
FIG. 1 is a circuit diagram of part of a conventional subscriber circuit.

FIG. 1 is a circuit diagram of part of a conventional subscriber circuit (also called line circuit) connected to a telephone terminal (not shown). A first wire 1 and a second wire 2 form a subscriber telephone line. A first bias circuit J1 applies a bias voltage to the first wire 1, and a second bias circuit J2 applies a bias voltage to the second wire 2. The first bias circuit J1 has a first terminal 3a, a second terminal 3b and a third terminal 3c. The second bias circuit J2 has a first terminal 4a, a second terminal 4b and a third terminal 4c.

The collector of an npn transistor Q1 and the first terminal 3a of the first bias circuit J1 are connected to the first wire 1. The emitter of the npn transistor Q1 is connected to a voltage source VBB via a resistor RA1. The second terminal 3b of the first bias circuit J1 is connected to the voltage source VBB, and the third terminal 3c thereof is connected to the non-inverting input terminal of an operational amplifier A1. The inverting input terminal of the operational amplifier A1 is connected to a node at which the emitter of the npn transistor Q1 and the resistor RA1 are connected in series to each other. The output terminal of the operational amplifier A1 is connected to the base of the npn transistor Q1.

The collector of a pnp transistor Q2 and the first terminal 4a of the second bias circuit J2 are connected to the second wire 2. The emitter of the pnp transistor Q2 is connected to ground GND via a resistor RB1. The second terminal 4b of the second bias circuit J2 is connected to the ground GND. The third terminal 4c of the second bias circuit J2 is connected to the non-inverting input terminal of an operational amplifier A2. The inverting input terminal of the operational amplifier A2 is connected to a node at which the emitter of the pnp transistor Q2 and the resistor RB1 are connected in series to each other. The output terminal of the operational amplifier A2 is connected to the base of the pnp transistor Q2.

It will now be assumed that the bias voltage output via the third terminal 3c of the first bias circuit J1 is VA1, and the bias voltage output via the third terminal 4c of the second bias circuit J2 is VB1. In an operating mode, the bias voltage VB1 appears at the pnp transistor Q2 because of the imaginary or virtual short-circuit of the operational amplifier A2. Similarly, the bias voltage VA1 appears at the pnp transistor Q1 because of the virtual short-circuit of the operational amplifier A1. The difference between the ground potential and the bias voltage VB1 and the difference between the power source voltage VBB and the bias voltage VA1 are equal to each other.

Hence, a feed current IL flowing in the subscriber terminal connected across the first line 1 and the second line 2 is equal to (VB1−G)/RB1, where G is the ground potential, and RB1 is the resistance value of the resistor RB1. When the first wire 1 and the second wire 2 are open-circuited, the feed current does not flow in the subscriber terminal. Hence, the first wire 1 is maintained at VBB, and the second wire 2 is maintained at G. In this case, a signal cannot be transferred because an AC signal (information) cannot be transferred in the state where the feed current does not flow in the subscriber terminal. For the above-mentioned reason, the circuit shown in FIG. 1 is not capable of providing the on-hook transmission services.

Figure 2:
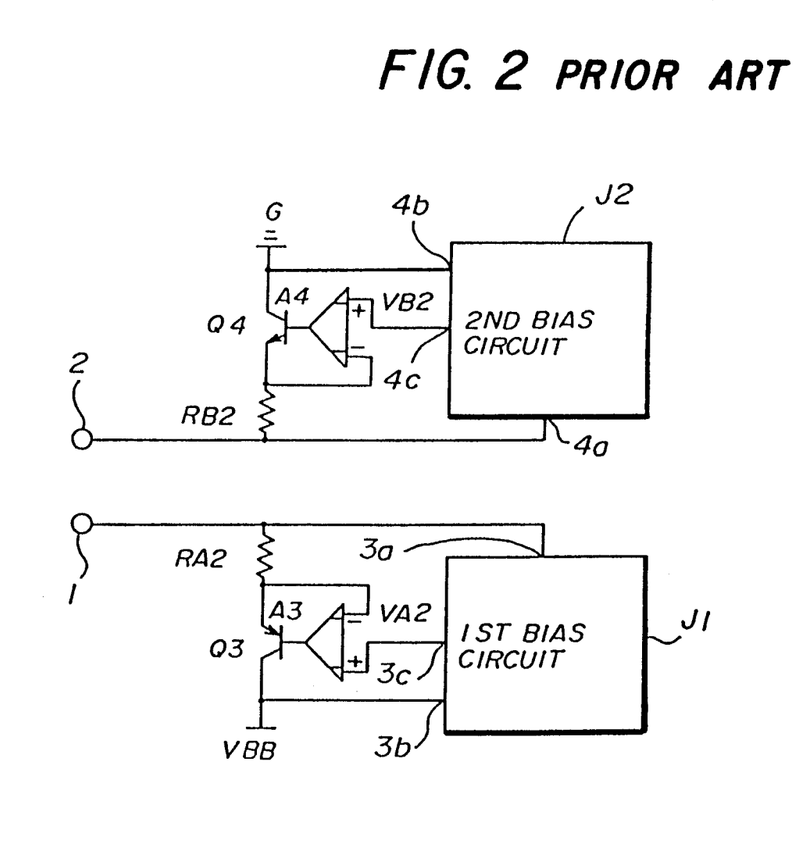
FIG. 2 is a circuit diagram of part of another conventional subscriber circuit having an on-hook transmission function.

FIG. 2 shows a modification of the circuit shown in FIG. 1 in order to enable the on-hook transmission services. In FIG. 2, parts that are the same as parts shown in FIG. 1 are given the same reference numbers or symbols. The emitter of a pnp transistor Q3 is connected to the first wire 1 via a resistor RA2. The first terminal 3a of the first bias circuit J1 is connected to the first wire 1. The collector of the pnp transistor Q3 is connected to the voltage source VBB.

The second terminal 3b of the first bias circuit J1 is connected to the voltage source VBB. The third terminal 3c of the first bias circuit J1 is connected to the non-inverting input terminal of an operational amplifier A3. The inverting input terminal of the operational amplifier A3 is connected to the emitter of the pnp transistor Q3. The emitter of an npn transistor Q4 is connected, via a resistor RB2, to the second wire 2 and the first terminal 4a of the second bias circuit J2. The collector of the npn transistor Q4 is connected to the ground GND. The second terminal 4b of the second bias circuit 4b is connected to the ground GND, and the third terminal 4c thereof is connected to the non-inverting input terminal of an operational amplifier A4. The inverting input terminal of the operational amplifier A4 is connected to the emitter of the npn transistor Q4. The output terminal of the operational amplifier A4 is connected to the base of the npn transistor Q4.

It will now be assumed that the bias voltage output via the third terminal 3c of the first bias circuit J1 is VA2, and the bias voltage output via the third terminal 4c of the second bias circuit J2 is VB2. In an operating state, the bias voltage VB2 appears at the npn transistor Q4 because of the virtual short-circuit of the operational amplifier A4. The bias voltage VA2 appears at the pnp transistor Q3 because of the virtual short-circuit of the operational amplifier A3. The difference between the bias voltage VB2 and the potential of the second wire 2 is equal to the difference between the bias voltage VA2 and the potential of the first wire 1. Hence, the subscriber terminal connected across the first wire 1 and the second wire 2 is maintained in the loop state, the feed current IL passing through the subscriber terminal is equal to (the difference between the bias voltage VB2 and the potential of the second wire 2)/RB2. In the above case, when the bias voltages VB2 and VA2 are respectively a few volts, a voltage (G−VB2) appears at the second wire 2, and a voltage (VA2−VBB) appears at the first wire 1. Hence, it is possible to provide the on-hook transmission services by means of the circuit configuration shown in FIG. 2.

However, a problem occurs when the circuit configuration shown in FIG. 2 is connected to a subscriber terminal which operates using the difference between the voltage of the first wire 1 and the second wire 2 obtained in the open-circuit state. There is a type of subscriber terminal that supervises the difference between the first and second wires 1 and 2 (normally, the above difference is 48 volts). The voltage VBB, (VA2+VB2) corresponding to the difference between the first and second wires 1 and 2 is fed to such a subscriber in the open-circuit state. Hence, this voltage applied to the subscriber terminal is out of the specification defined for it, and the subscriber terminal cannot operate or malfunctions.

SUMMARY OF THE INVENTION

It is a general object of the present invention to provide an on-hook transmission circuit in which the above disadvantage is eliminated.

A more specific object of the present invention is to provide an on-hook transmission circuit capable of providing the on-hook transmission services without causing malfunction of the subscriber terminal.

The above objects of the present invention are achieved by an on-hook transmission circuit provided in a subscriber circuit connected between a subscriber terminal and an exchange, the on-hook transmission circuit comprising: first bias means for biasing a first wire connected to the subscriber terminal; second bias means for biasing a second wire connected to the subscriber terminal; constant-current source means, coupled to the first and second wires, for making a constant-current flow through the first and second wires during a period while a control signal indicating that an on-hook transmission should be turned ON is being received; and loop supervisory means, coupled to the constant-current source means, for detecting establishment of a loop including the first and second wires and the subscriber terminal and for generating a scan signal used for causing the constant-current source means to stop causing the constant current to flow through the first and second wires when detecting the establishment of the loop.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENT

A description will now be given, with reference to FIGS. 3 through 8 of an on-hook transmission circuit according to an embodiment of the present invention. In FIGS. 3 through 8, parts that are the same as parts shown in FIGS. 1 and 2 are given the same reference numbers as previously. A first bias unit 3 shown in FIG. 3 applies a bias voltage to the first wire 1, and a second bias unit 4 applies a bias voltage to the second wire 2. The first bias unit 3 comprises the first bias circuit J1, the operational amplifier A1, the npn transistor Q1 and the resistor RA1, as shown in FIG. 1. The second bias unit 4 comprises the second bias circuit J2, the operational amplifier A2, the pnp transistor Q2, and the resistor RB1, as shown in FIG. 1.

Figure 3:
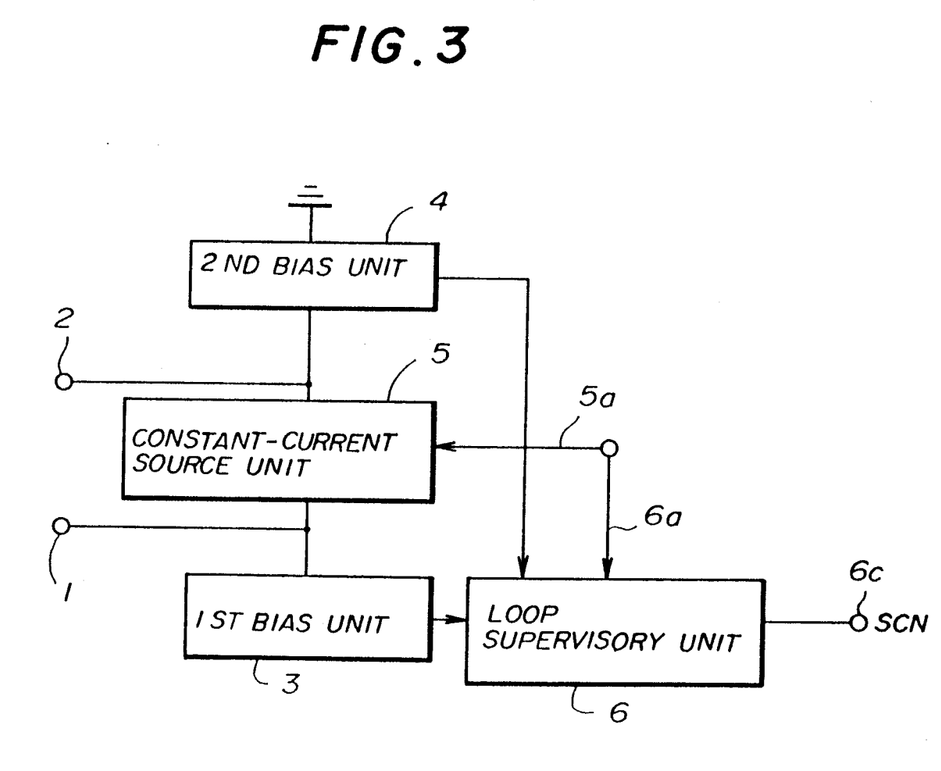
FIG. 3 is a block diagram showing an overview of an on-hook transmission circuit according to an embodiment of the present invention.

The first bias circuit J1 has the first terminal 3a, the second terminal 3b, and the third terminal 3c. The second bias circuit J2 has the first terminal 4a, the second terminal 4b, and the third terminal 4c. The collector of the npn transistor Q1 and the first terminal 3a of the first bias circuit J1 are connected to the collector of the npn transistor Q1. The emitter of the npn transistor Q1 is connected to the voltage source VBB via the resistor RA1.

The second terminal 3b of the first bias circuit J1 is connected to the voltage source VBB, and the third terminal 3c thereof is connected to the non-inverting input terminal of the operational amplifier A1. The inverting input terminal of the operational amplifier A1 is connected to a node at which the emitter of the npn transistor Q1 and the resistor RA1 are connected in series to each other. The output terminal of the operational amplifier A1 is connected to the base of the npn transistor Q1.

The collector of the npn transistor Q2 and the first terminal 4a of the second bias circuit J2 are connected to the second wire 2. The emitter of the pnp transistor Q2 is connected to ground GND via the resistor RB1.

The second terminal 4b of the second bias circuit J2 is connected to ground GND, and the third terminal 4c thereof is connected to the non-inverting input terminal of the operational amplifier A2. The inverting input terminal of the operational amplifier A2 is connected to a node where the emitter of the pnp transistor Q2 and the resistor RB1 are connected in series to each other. The output terminal of the operational amplifier A2 is connected to the base of the pnp transistor Q2.

A constant-current source unit 5 is connected between the first wire 1 and the second wire 2, and is controlled by a control signal applied to a control signal terminal 5a, which is connected to the base of a pnp transistor Q5. The emitter of the pnp transistor Q5 is connected to a voltage source VCC via a resistor R3. The voltage source VCC is connected to the base of the pnp transistor Q5 via a capacitor C1. A resistor R2 is connected in parallel with the capacitor C1.

The collector of the pnp transistor Q5 is connected to the first wire 1 via a resistor R4 and the base of an npn transistor Q6. The collector of the npn transistor Q6 is connected to the second wire 2, and the emitter thereof is connected to the first wire 1 via a resistor R5.

The inverting input terminals of the operational amplifiers A1 and A2 as well as the control signal terminal 5a are connected to a loop supervisory unit 6. The signals at the inverting input terminals of the operational amplifiers A1 and A2 are applied to a current-voltage conversion circuit 6b, which generates a converted voltage Vlp applied to one input terminal of a comparator CMP1. The loop supervisory unit 6 compares a variation in the signals from the bias units 3 and 4 with a threshold voltage Vth, and outputs a scan signal SCN based on the comparison result to a scan signal output terminal 6c. The above-mentioned threshold voltage Vth is varied in synchronism with the above-mentioned signal variation.

Figure 4:
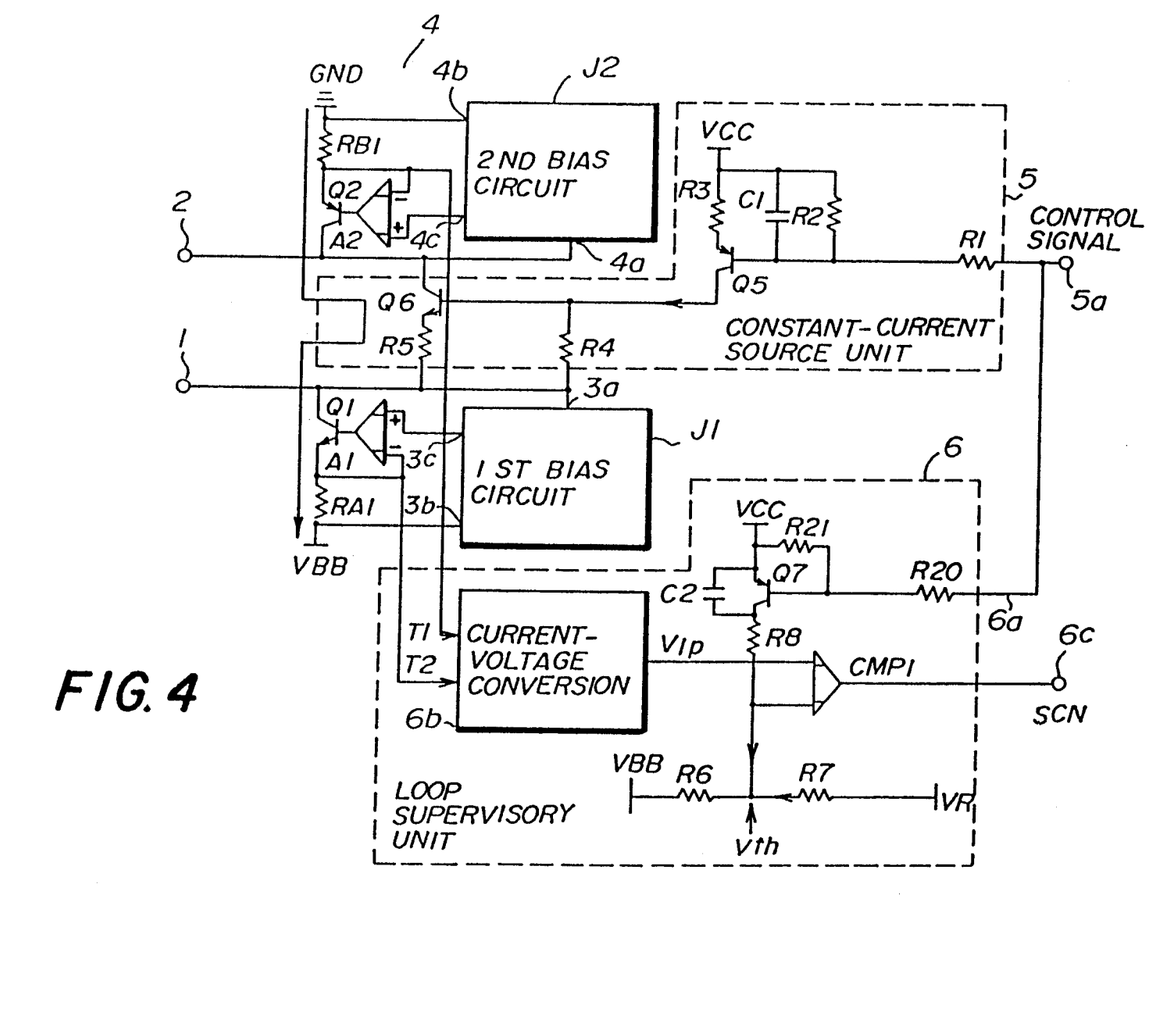
FIG. 4 is a block diagram showing the details of the on-hook transmission circuit shown in FIG. 3.

The control signal terminal 5a is connected to the base of a pnp transistor Q7 via a resistor R20. The emitter of the pnp transistor Q7 is connected to the voltage source VCC, which is connected to the base of the pnp transistor Q7 via a resistor R21. A capacitor C2 functioning as a smoothing element is connected between the emitter and collector of the pnp transistor Q7. The collector of the transistor Q7 is connected to the other input terminal of the comparator CMP1 via a resistor R8.

The other input terminal of the comparator CMP1 is also connected to a current branching circuit, which is made up of resistors R6 and R7 connected in series between the voltage source VBB and a reference voltage source VR. A node which connects the resistors R6 and R7 is connected to the other input terminal of the comparator CMP1. Currents flow in the current branching circuit, as shown by the arrows in FIG. 4.

Figure 5:
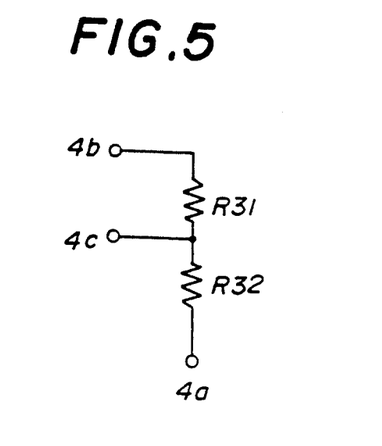
FIG. 5 is a circuit diagram of each bias circuit shown in FIG. 4.

As shown in FIG. 5, the second bias circuit J2 is made up of, for example, resistors R31 and R32. One end of the resistor R31 functions as the second terminal 4b, and the other end thereof functions as the third terminal 4c. One end of the resistor R32 functions as the first terminal 4a, and the other end thereof is connected to the other end of the resistor R31.

Figure 6:
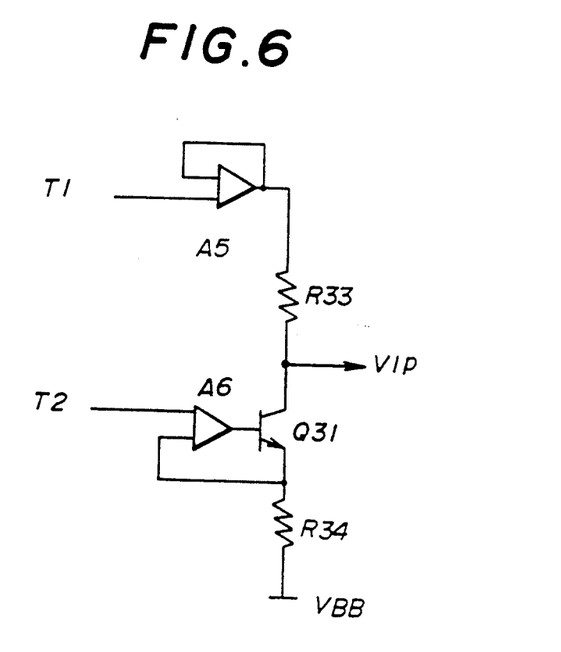
FIG. 6 is a circuit diagram of a current-voltage conversion circuit shown in FIG. 4.

As shown in FIG. 6, the current-voltage conversion circuit 6b comprises two operational amplifiers A5 and A6, an npn transistor Q31, and two resistors R33 and R34. The non-inverting input terminal T1 of the operational amplifier A5 is connected to the emitter of the pnp transistor Q2, and the non-inverting input terminal T2 of the operational amplifier A6 is connected to the emitter of the npn transistor Q2. The inverting input terminal of the operational amplifier A5 is connected to the output terminal thereof, and the inverting terminal of the operational amplifier A6 is connected to the output terminal thereof. The output terminal of the operational amplifier A5 is connected to the collector of the transistor Q31 via the resistor R33. The output terminal of the operational amplifier A6 is connected to the base of the transistor Q31. The emitter of the transistor Q31 is connected to the voltage source VBB via the resistor R34. The voltage signal Vlp is output via the collector of the transistor Q31. The voltage drop developed across the resistor RA1 is approximately equal to the voltage drop across the resistor R34. Similarly, the voltage drop developed across the resistor RB1 is approximately equal to the voltage drop across the resistor R33.

A description will now be given of the operation of the circuit shown in FIG. 4. The control signal for indicating on-hook transmission is applied to the control signal terminal 5a, and is either "0" or "1". In the normal mode, "1" is applied to the control signal terminal 5a (since the voltage VCC appears at the terminal 5a), and the transistor Q5 is OFF. Hence, the constant-current source 5 does not generate any current. The transistor Q7 is OFF, and the threshold voltage Vth used in the loop supervisory unit 6 does not change.

When the control signal switches to "0", that is, when on-hook transmission is turned ON, the voltage V1 between the voltage source VCC and the base of the pnp transistor Q5 is as follows:

$$V1 = R2/(R1+R2) \times Vcc.$$

In addition, the following equation is obtained:

$$I1 = (V1 - VBE5)/R3$$

where VBE5 is the base-emitter voltage of the pnp transistor Q5. In addition, $$V2 = R4 \times I1$$

$$Ioht = (V2 - VBE6)/R5$$

where Ioht is the constant current, and VBE6 is the base-emitter voltage of the npn transistor Q6.

In the loop supervisory unit 6, the following holds:

$$I6 = I7 + I8$$

where I6, I7 and I8 respectively denote the currents passing through the resistors R6, R7 and R8. Particularly, I8 is referred to as a control current based on the control signal applied to the terminal 5a. The above equation can be rewritten as follows:

$$(Vth - VBB)/R6 = (VR - Vth)/R7 + (VCC - Vth)/R8$$

$$Vth = \{(R6 \times R7 \times Vcc) + (R6 \times R8 \times VR) + (R7 \times R8 \times VBB)\}/\{(R6 \times R7) + (R6 \times R8) + (R7 \times R8)\}.$$

In this manner, the threshold voltage Vth changes.

Figure 7:
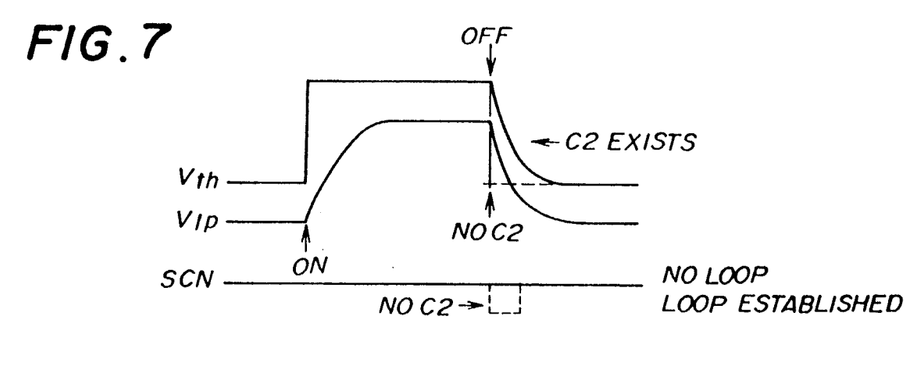
FIGS. 7 and 8 are waveform diagrams showing the operation of the circuit shown in FIG. 4.

FIG. 7 is a waveform diagram showing the operation in which on-hook transmission is turned ON and then turned OFF. In FIG. 7, Vlp denotes the output voltage of the current-voltage conversion circuit 6b. As shown in FIG. 7, the threshold voltage Vth is increased when the on-hook transmission is turned ON. The output voltage Vlp of the conversion circuit 6b gradually increases after the on-hook transmission is turned ON.

If the capacitor C2 is not used, the threshold voltage Vth changes, as indicated by the broken line shown in FIG. 7. The voltage Vlp gradually increases and gradually decreases because of the function of the time constant, while the threshold voltage Vth abruptly decreases because there is no function of a time constant. Hence, the threshold voltage Vth has a rectangular waveform. In this case, the threshold voltage Vth instantaneously becomes lower than the voltage Vlp, and the loop via the subscriber terminal is instantaneously established (the scan signal SCN is instantaneously switched to a low level), as indicated by the broken line in FIG. 7. It will be noted that the capacitor C1 prevents noise contained in the voltage source VCC from being superimposed on the constant current Ioht.

It can be seen from the above that the loop supervisory unit 6 increases the threshold voltage Vth as the voltage Vlp increases and hence prevents an erroneous acknowledgement in which the called terminal station responds to a call irrespective of the fact that the called terminal is in on-hook state (transmission). Hence, in the on-hook transmission, the threshold voltage Vth is always kept higher than the output voltage Vlp of the conversion circuit 6b, and the scan signal SCN does not change.

The on-hook transmission is performed, for example, during an interval between the first and second ringing signals (pulses). While the on-hook transmission is active, information indicating the telephone number of the calling subscriber is transferred to the called subscriber, and is displayed on a display unit of the called subscriber.

Figure 8:
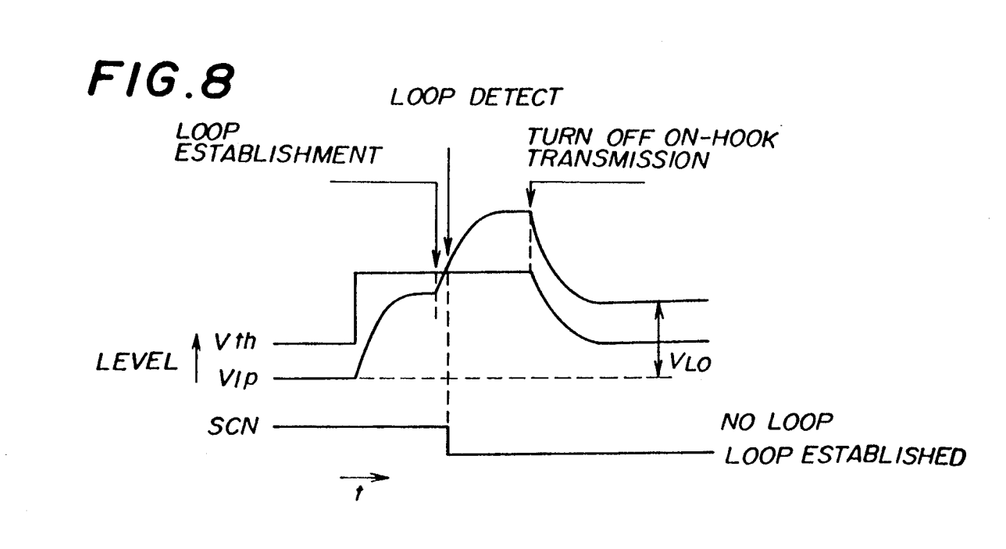

When the called subscriber responds to the call and picks up the handset, the circuit shown in FIG. 4 operates, as shown in FIG. 8. When the on-hook transmission is turned ON, the output voltage Vlp starts to increase. At the time when the called subscriber picks up the handset, the loop is established and the output voltage Vlp starts to further increase. Then, a loop current flows through the first and second wires 1 and 2. When the output voltage Vlp becomes equal to or greater than the threshold voltage Vth, the loop is detected and hence the scan signal SCN is switched to the low level. When the control signal is turned OFF and the on-hook transmission is released, the output voltage Vlp starts to decrease, and the threshold voltage Vth also starts to decrease. Then, the output voltage Vlp is maintained at a voltage VLO corresponding to the loop current. The voltage VLO is higher than the threshold voltage Vth after on-hook transmission is turned OFF and both the Vth and Vlp are settled. Hence, the scan signal is maintained at the low level so that it continues to indicate that the loop exists.

Figure 9:
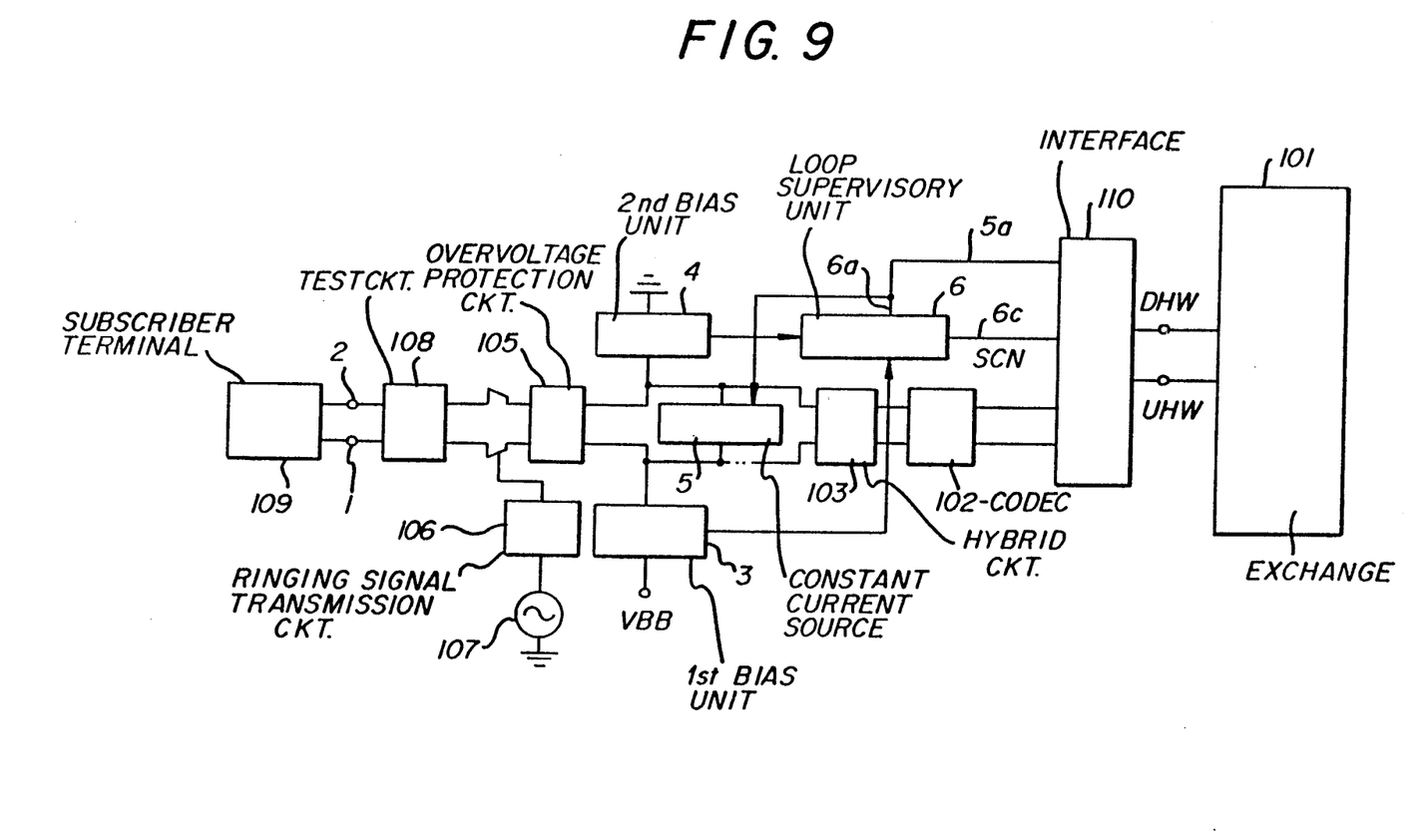
FIG. 9 is a block diagram of a subscriber circuit equipped with the on-hook transmission circuit of the present invention.

FIG. 9 is a block diagram of a subscriber circuit equipped with the on-hook transmission circuit according to the embodiment of the present invention. The subscriber circuit shown in FIG. 9 is connected between a subscriber terminal 109 and an exchange 101. The subscriber circuit comprises the first and second bias units 3 and 4, the constant-current source 5, and the loop supervisory unit 6. Further, the subscriber circuit comprises a codec (coder/decoder) 102, a hybrid circuit 103, an overvoltage protection circuit 105, a ringing signal transmission circuit 106, a ringing signal source 107, a test circuit 108, and an interface 110. The subscriber circuit has the functions of so-called BORSCHT (Battery feed, Overvoltage protection, Ringing, Supervision, Codec, Hybrid, and Testing). The interface 110 is connected to an up highway UHW, and a down highway DHW. The interface 110 receives a speech signal from the codec 102, and the scan signal SCN. In practice, the interface 110 receives other signals in the conventional manner. Further the interface 110 outputs the control signal to the control signal terminal 5a. In practice, the interface 110 outputs other signals in the conventional manner.

The present invention is not limited to the specifically disclosed embodiments, and variations and modifications may be made without departing from the scope of the present invention.

What is claimed is:

1. An on-hook transmission circuit provided in a subscriber circuit connected between a subscriber terminal and an exchange, said on-hook transmission circuit comprising:

first bias means for biasing a first wire connected to the subscriber terminal;

second bias means for biasing a second wire connected to the subscriber terminal;

constant-current source means, coupled to the first and second wires, for making a constant current flow in the first and second wires during a period in which a control signal indicating that an on-hook transmission should be turned ON is being received; and loop supervisory means, coupled to said constant-current source means, for detecting establishment of a loop that includes the first and second wires and the subscriber terminal and for generating a scan signal used for causing the constant-current source means to stop the constant-current flowing in the first and second wires when detecting the establishment of the loop.

2. The on-hook transmission circuit as claimed in claim 1, wherein said loop supervisory means comprises first means for generating a converted voltage signal dependent on variations in currents flowing in the first and second bias means for biasing the first and second wires, respectively, and for comparing the converted voltage signal with a threshold voltage variable in response to the control signal, so that the threshold voltage varies in synchronism with the converted voltage signal in an on-hook state in which the first and second wires are open-circuited.

3. The on-hook transmission circuit as claimed in claim 2, wherein said loop supervisory means comprises second means for varying the threshold voltage so that the threshold voltage is always higher than the converted voltage signal in the on-hook state.

4. The on-hook transmission circuit as claimed in claim 2, wherein said loop supervisory means comprises second means for rapidly increasing the threshold voltage when the on-hook transmission is turned ON and for gradually decreasing the threshold voltage when the on-hook transmission is turned OFF.

5. The on-hook transmission circuit as claimed in claim 3, wherein said loop supervisory means comprises third means for rapidly increasing the threshold voltage when the on-hook transmission is turned ON and for gradually decreasing the threshold voltage when the on-hook transmission is turned OFF.

6. The on-hook transmission circuit as claimed in claim 2, wherein said first means comprises:

a resistor network across which first and second voltages are applied; and second means for controlling a control current passing through a node in the resistor network, the threshold voltage being a voltage at the node.

7. The on-hook transmission circuit as claimed in claim 3, wherein said first means comprises:

a resistor network across which first and second voltages are applied; and third means for controlling a control current passing through a node in the resistor network, the threshold voltage being a voltage at the node.

8. The on-hook transmission circuit as claimed in claim 4, wherein said first means comprises:

a resistor network across which first and second voltages are applied; and fourth means for controlling a control current passing through a node in the resistor network, the threshold voltage being a voltage at the node.

9. The on-hook transmission circuit as claimed in claim 1, wherein said constant-current source means comprises:
    a transistor having a first terminal connected to the first wire, a second terminal connected to the second wire via a first resistor, and a base connected to the second terminal via a second resistor; and
    second means, coupled to the base of said transistor, for generating a base voltage in response to the control signal.

10. The on-hook transmission circuit as claimed in claim 9, wherein said second means comprises third means for eliminating noise caused in the second means.

11. The on-hook transmission circuit as claimed in claim 3, wherein the threshold voltage becomes higher than the converted voltage signal when the loop has been established.

12. The on-hook transmission circuit as claimed in claim 7, wherein said second means comprises:
    a transistor having a first terminal receiving a predetermined voltage, a second terminal coupled to said node, and a base receiving the control signal; and
    a capacitor connected between the first and second terminal of said transistor.

* * * * *